No. 620,455. Patented Feb. 28, 1899.
H. P. JONES.
BINDER FRAME.
(Application filed Jan. 27, 1898.)
(No Model.)
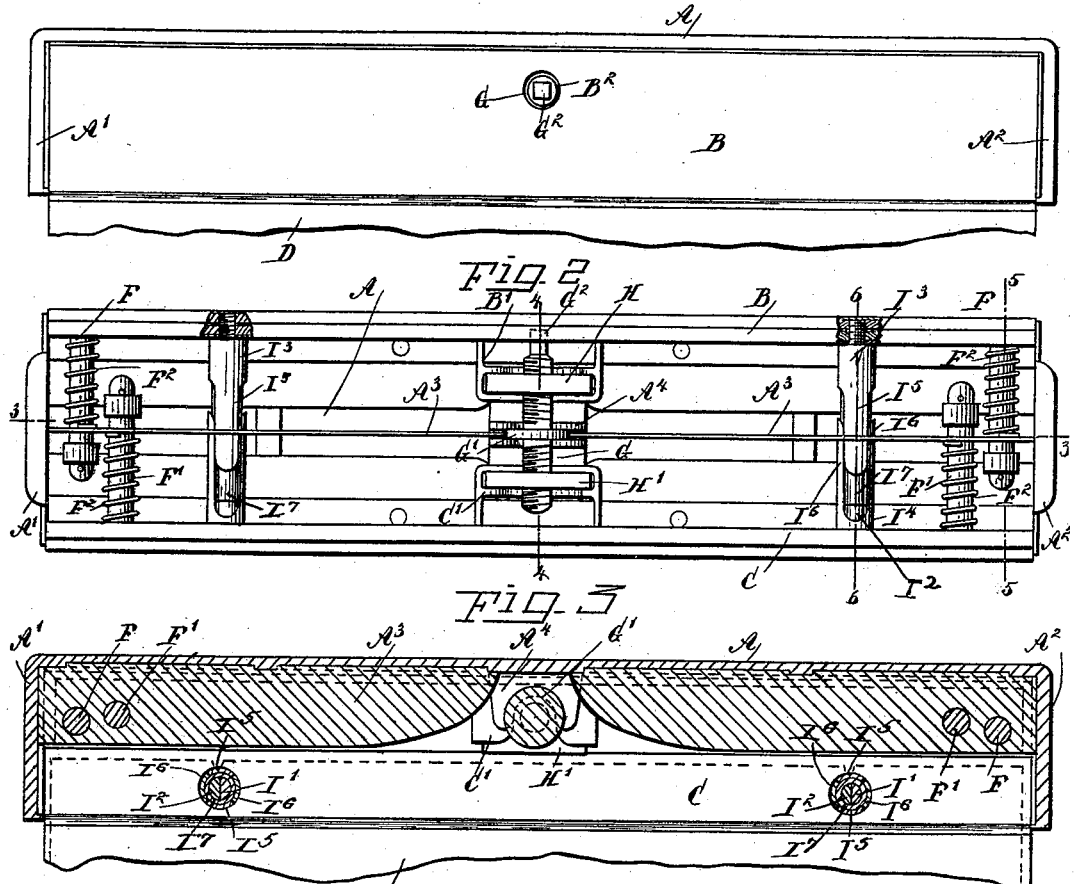
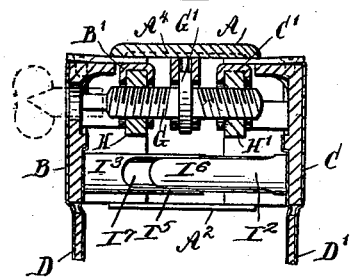
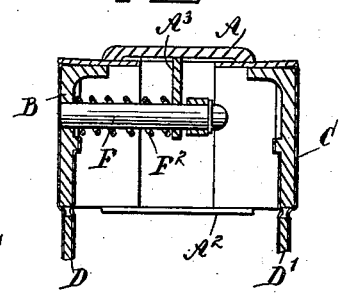
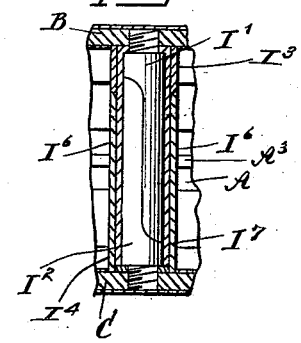
WITNESSES
J. H. Brophy
INVENTOR
H. P. Jones
BY
ATTORNEYS.

UNITED STATES PATENT OFFICE.

HARVEY P. JONES, OF CHICAGO, ILLINOIS.

BINDER-FRAME.

SPECIFICATION forming part of Letters Patent No. 620,455, dated February 28, 1899.

Application filed January 27, 1898. Serial No. 668,166. (No model.)

*To all whom it may concern:*

Be it known that I, HARVEY P. JONES, of Chicago, in the county of Cook and State of Illinois, have invented a new and Improved Binder-Frame, of which the following is a full, clear, and exact description.

The invention relates to bookbinding; and its object is to provide a new and improved binder-frame which is simple and durable in construction and readily adjusted to permit of conveniently and quickly binding the leaves in such a manner that they are readily separately movable and interchangeable.

The invention consists of novel features and parts and combinations of the same, as will be described hereinafter, and pointed out in the claims.

Reference is to be had to the accompanying drawings, forming a part of this specification, in which similar characters of reference indicate corresponding parts in all the figures.

Figure 1 is a plan view of the improvement. Fig. 2 is a front elevation of the same. Fig. 3 is a sectional plan view of the same on the line 3 3 of Fig. 2. Fig. 4 is a transverse section of the same on the line 4 4 of Fig. 2. Fig. 5 is a similar view of the same on the line 5 5 of Fig. 2, and Fig. 6 is an enlarged transverse section of the improvement on the line 6 6 of Fig. 2.

The improved binder-frame is provided with a main frame A, made U-shaped and formed at its ends $A'$ $A^2$ into bearings for the ends of the top and bottom clamping-plates B and C, made L-shaped, as is plainly indicated in the drawings, so that said main frame and the clamping-plates form a hollow casing, which is open at the front for the insertion of the leaves, the back edges of which are trimmed and punched to engage dowel-pins, as hereinafter more fully described, the leaves being pressed securely together at their backs by the clamping-plates B and C being moved toward each other. The top and bottom plates B and C are provided with extensions D D', forming the bottom and top covers for the leaves held in the binder-frame.

In order to properly guide the clamping-plates B and C toward or from each other, I provide the same with guide-pins F F', respectively fitted to slide in suitable bearings formed in a rib $A^3$, extending on the inside of the main frame A, as is plainly shown in Fig. 2, and on the guide-pins are coiled springs $F^2$, resting with one end on the corresponding clamping-plate and at the other end on the rib $A^3$ to press the clamping-plates outward from each other.

In order to move the clamping-plates B and C toward or from each other for binding or releasing the leaves between the plates, I provide a right and left hand screw G, formed at its middle with a collar $G'$, mounted to turn in a bearing $A^4$, formed on the main frame A, at the middle thereof, the front of the bearing being open to permit of removing the collar and the screw-rod from the frame. The screw-rod engages nuts H H', removably held in guideways $B'$ and $C'$, respectively, on the clamping-plates B and C, respectively, to permit of removing the screw-rod and its nuts from the binder-frame whenever desired. The upper end of the screw-rod G is formed with a polygonal offset $G^2$, adapted to be engaged by a suitable key inserted through an opening $B^2$ in the top clamping-plate B. When the screw-rod G is turned by means of the key, the nuts H H' are caused to travel simultaneously on said screw-rod either toward or from each other, according to the direction in which the screw-rod is turned, and as the nuts are held in guideways integral with the clamping-plates B and C it is evident that the latter move toward or from each other with said nuts to clamp the leaves in place or to release the same whenever it is desired to insert a new leaf or remove one from the leaves in the frame.

The clamping-plates B and C are provided, respectively, with dowel-pin sections $I'$ and $I^2$, which are reduced in width, as shown best in Fig. 6, so as to slide the one upon the other. The dowel-pin section $I'$ has fast thereto and moving therewith and with the clamping-plate B a tube $I^7$, which incloses the sections $I'$ and $I^2$ and which when the clamping-plates B and C are moved to their innermost position engages with the clamping-plate C. Fast on the tube $I^7$ is a cylindrical section $I^3$, which embraces the tube and lies snugly against the same and which is provided with two oppositely-arranged tongues $I^5$. Fast to the clamping-plate C and sliding loosely yet snugly over the tube $I^7$ is a cylindrical section $I^4$, which is provided with oppositely-arranged tongues I⁶, respectively adapted to slide between the tongues I⁵ of the cylindrical section I³. Thus it will be seen that as the clamping-plates B and C move toward and from each other the plate B carries with it the dowel-pin section I', the tube I⁷, and the cylindrical section I³ with its tongues I⁵, while the clamping-plate C carries with it the dowel-pin section I² and the cylindrical section I⁴ with its tongues I⁶. By these devices the plates B and C are securely guided in their movement and a strong adjustable bearing for the leaves is formed. It will also be seen that as the plates B and C are adjustable the exterior forms of these bearings for the leaves are not changed. It is understood that the dowel-pins I are in the front portion of the casing, while the rib A³ with the guide-pins F F' and the screw-rod G are in the rear portion of the casing, so as not to interfere with the backs of the leaves extending into the front part of the casing.

The binder constructed as described forms a detachable leaf-binder for books of any kind and so binds the leaves that they are separately movable and interchangeable, as the operator is enabled to readily open the clamping-plates by turning the screw-rod G for the insertion or removal of a leaf.

Having thus fully described my invention, I claim as new and desire to secure by Letters Patent—

1. A binder provided with a main frame, top and bottom clamping-plates fitted to slide toward or from each other in said main frame, and a right and left hand screw mounted to turn in said main frame, and engaging nuts on said clamping-plates, the screw and nuts being removably held in said frame and plates, substantially as shown and described.

2. A binder-frame provided with dowel-pins made in cylindrical sections fitted to slide one on the other, each section having tongues lengthwise of the sections and fitting into the recesses between the tongues of the other section, substantially as shown and described.

3. The combination of two clamping-sections mounted to move toward and from each other, and dowel-pins respectively carried by the sections and having interlocking tongues and recesses sliding on each other.

4. The combination of a main frame or portion, a right and left hand screw mounted to turn thereon, two clamping-plates sliding on the main frame or portion and engaged by the screw to be moved thereby, and slidably-engaged dowel-pins held respectively by the clamping-plates and moving with the same.

5. The combination of a main frame or portion, a rib extending longitudinally along the same, two clamping-plates slidable toward and from each other on the main frame or portion, guide-pins respectively carried by the clamping-plates and slidable in the rib, and springs carried on the guide-pins and bearing between the rib and the clamping-plates.

HARVEY P. JONES.

Witnesses:
W. H. MOORE,
H. R. REYNOLDS.